9/21/76 XR RE 28,970

United States Patent [19]

Shapiro

[11] E Re. 28,970

[45] Reissued Sept. 21, 1976

[54] LIQUID DISPENSING DEVICE

[76] Inventor: Justin J. Shapiro, 1802 Second St., Berkeley, Calif. 94710

[22] Filed: Feb. 25, 1975

[21] Appl. No.: 552,739

Related U.S. Patent Documents

Reissue of:

[64] Patent No.: 3,211,335
Issued: Oct. 12, 1965
Appl. No.: 333,068
Filed: Dec. 24, 1963

[52] U.S. Cl. ..... 222/50; 222/309; 222/382; 222/383

[51] Int. Cl.[2] ..... B67D 5/22

[58] Field of Search ..... 222/309, 50, 382, 383

[56] References Cited

UNITED STATES PATENTS

| | | | |
|---|---|---|---|
| 2,792,157 | 5/1957 | Gilman | 222/309 |
| 3,067,915 | 12/1962 | Shapiro et al. | 222/309 X |
| 3,122,280 | 2/1964 | Goda | 222/309 |

*Primary Examiner*—Allen N. Knowles
*Attorney, Agent, or Firm*—Herman L. Gordon

[57] ABSTRACT

A burette consisting of a calibrated syringe chamber with a top flange and a reciprocable dispensing plunger. The plunger has a top actuator with a depending vertical rod on which is adjustably mounted a stop collar serving as a dispensing volume indicator and being engageable with said top flange to limit the upward extension of the plunger. The syringe chamber has a bottom outlet conduit including a check valve which opens when the plunger is drawn upwardly. The syringe chamber also has a discharge conduit at the level of the lowermost position of the bottom end of the plunger, the discharge conduit having a check valve which opens when the plunger is pushed downwardly for a discharge stroke. The chamber has a vent tube connected thereto at its lower portion. Below this the chamber has a peripheral rib, and O-rings are mounted on the chamber above and below the rib. An internally threaded annular cap surrounds the O-rings and acts to clamp the O-rings against the intervening rib when the cap is tightened on the neck of a container, so as to provide an air-tight seal relative to the container when the cap is tightened.

2 Claims, 4 Drawing Figures

INVENTOR
JUSTIN J. SHAPIRO

BY Herman L. Gordon

ATTORNEY

LIQUID DISPENSING DEVICE

Matter enclosed in heavy brackets [ ] appears in the original patent but forms no part of this reissue specification; matter printed in italics indicates the additions made by reissue.

This invention relates to devices for accurately dispensing liquids, and more particularly to dispensing burettes.

A main object of the invention is to provide a novel and improved apparatus for accurately dispensing liquids, the apparatus being simple in construction, being easy to use, and offering a high degree of reliability, speed, accuracy and convenience in use.

A further object of the invention is to provide an improved burette apparatus which is inexpensive to manufacture, which is highly flexible in use, and which may be safely used with a wide range of liquid materials, including concentrated acids, corrosive, dangerous, toxic, or odoriferous reagents, strong solvents, or the like, all of which may be safely and instantly dispensed with volumetric pipette precision from their closed containers by means of te burette apparatus of the present invention.

A still further object of the invention is to provide a precise and jam-free dispensing burette apparatus of the plunger type, suitable for use in accurately dispensing liquid materials from various types of containers, such as bottles, flasks, beakers, tubes, etc., the apparatus having wide versatility, being easy to keep clean, being automatically bubble-free, and having a high repetitive accuracy.

Further objects and advantages of the invention will become apparent from the following description and claims, and from the accompanying drawings, wherein:

Figure 1:
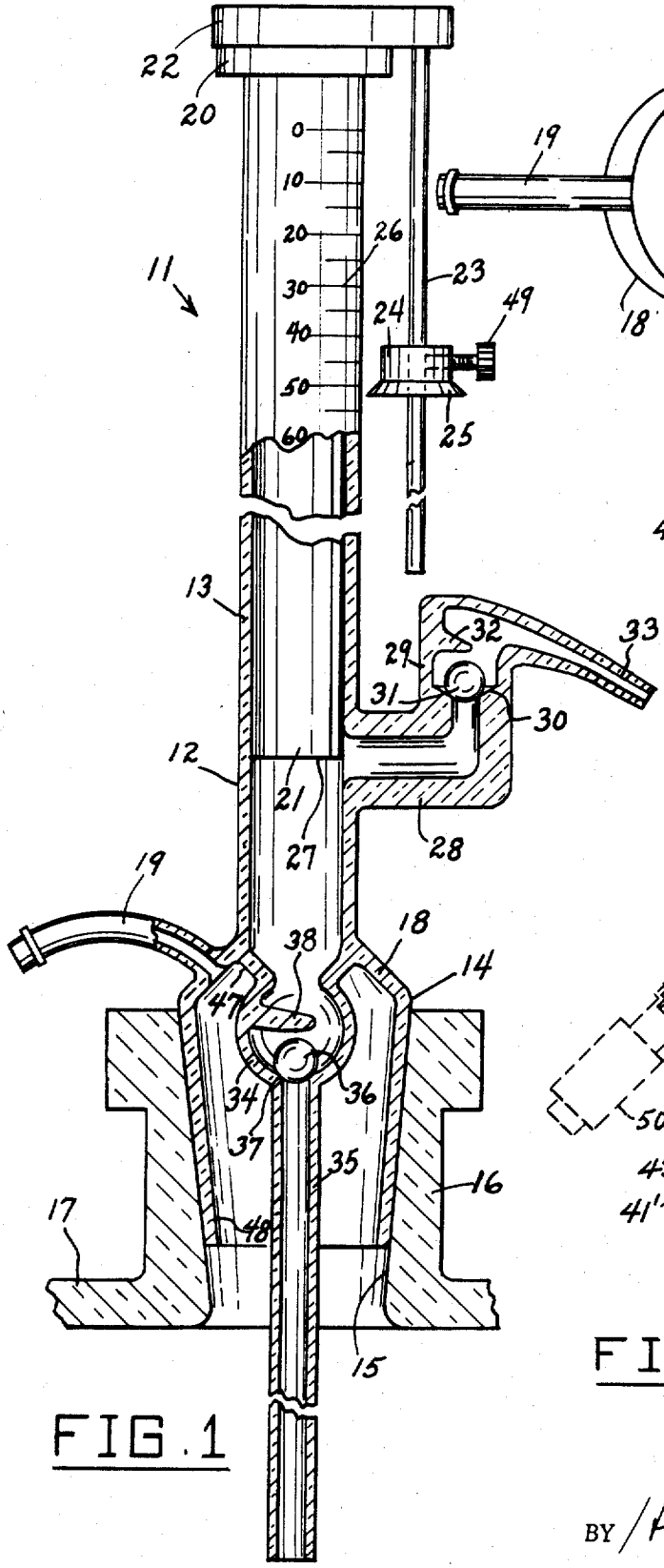
FIG. 1 is a side elevational view, partly in vertical cross-section, of one form of burette apparatus constructed in accordance with the present invention, shown mounted in the neck of a reagent bottle.
Figure 2:
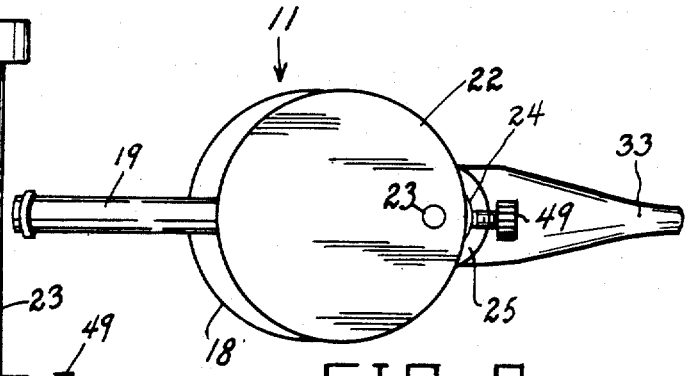
FIG. 2 is a top plan view of the burette apparatus of FIG. 1.

Referring to the drawings, and more particularly to FIGS. 1 and 2, 11 generally designates one form of burette apparatus constructed in accordance with this invention. The apparatus 11 comprises a main body 12 of glass or other suitable material comprising a generally cylindrical vertical barrel portion 13 formed integrally with an enlarged hollow bottom stopper member 14 whose lower portion 48 is generally frusto-conical and downwardly tapering in shape so as to sealingly engage in the correspondingly shaped bore 15 of the neck 16 of a conventional reagent bottle 17. The stopper member 14 has the upwardly tapering frusto-conical top wall 18 which is integrally formed with the outwardly extending generally arcuate vent tube 19 communicating with the interior of the stopper member, and hence with the upper portion of the associated bottle 17.

The barrel 13 is integrally formed at its top end with an annular flange 20. Slidably and sealingly engaged in the barrel 13 is the syringe plunger 21, said plunger having eccentrically and rigidly secured to its top end the relatively large operating disc 22. Rigidly secured to a marginal portion of disc 22 is a depending rod 23 which extends parallel to and adjacent to the barrel 13 and is provided with the adjustable stop collar 24, said collar being engageable with top flange 20 to limit the upward extension of plunger 21. The collar is provided with a downwardly divergent frusto-conical bottom flange 25 extending adjacent a volumetric scale 26 inscribed on barrel 13. The collar is further provided with a clamping screw 49 to lock it in an adjusted position on rod 23, said position corresponding to a predetermined desired discharge volume of the burette apparatus, as indicated by the flange 25 on scale 26 when the plunger 21 is in its lowermost position, as shown in FIG. 1.

Barrel 13 is integrally formed at a location substantially corresponding to the lowermost position of the bottom end 27 of plunger 21 with an outlet conduit 28 extending perpendicular to the barrel, which is in turn integrally formed with an outer vertical portion 29 extending upwardly and parallel to barrel 13. Said vertical conduit portion 29 is formed with a frusto-conical downwardly convergent ball seat 30 on which is disposed a movable valve ball 31. Upward movement of said valve ball is limited by an inwardly projecting stop lug 32 formed integrally with the inner wall of conduit portion 29. Conduit portion 29 terminates in an integral outwardly and downwardly inclined discharge conduit 33, which terminates substantially at the level of the ball seat 30.

The lower end of barrel 13 communicates with the top end of a generally spherical ball valve housing 34 through a substantially frusto-conical downwardly convergent connecting wall element 47, said housing 34 being located in the upper portion of hollow stopper 14. Integrally connected with the lower end of housing 34 in communication therewith is a depending vertical intake conduit 35 of sufficient length to extend to the lower portion of the reagent bottle 17. A movable valve ball 36 is disposed in the annular seat 37 defined at the top end of conduit 35. Upward movement of valve ball 36 is limited by an inwardly projecting stop lug 38 integrally formed on the inside wall of housing 34.

Figure 4:
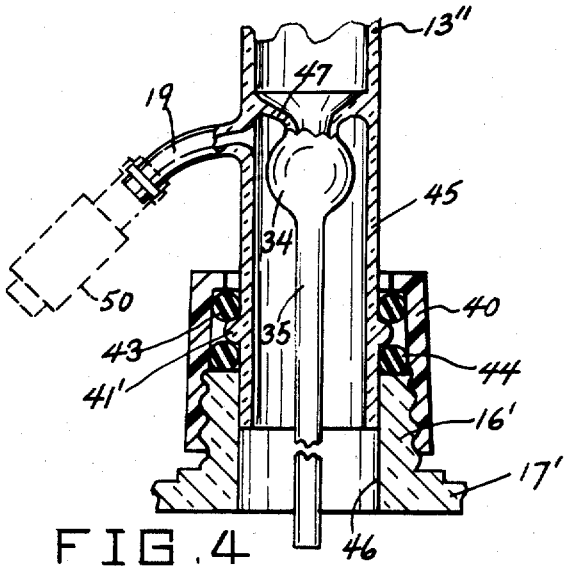
FIG. 4 is a fragmentary vertical cross-sectional view taken through the neck portion of a screw cap container in which is mounted still another form of burette apparatus constructed according to the present invention.

The reagent in the bottle 17 may be kept pure and free of moisture, interfering ions, or airborne contaminants by attaching a drying tube with an appropriate filter or absorber to the air inlet tube 19, for example, as diagrammatically shown at 50 in FIG. 4.

In operation, with the burette apparatus mounted in the neck 16 of the container 17, all air bubbles are first removed and the dispensing tip 33 is filled by pumping the plunger 21. With the collar 24 set at the required position on rod 23, the plunger 21 is lifted until collar 24 abuts flange 20. After a short period to allow for stabilization, the plunger 21 is depressed all the way, thereby delivering the desired volume of reagent through the tip 33.

It will be noted that on an upward stroke of plunger 21, suction is developed in barrel 13, whereby atmospheric pressure forces liquid from the container 17 upwardly past ball valve element 36, whereas ball valve element 31 is held closed by atmospheric pressure during the upward stroke of said plunger. On the downward stroke of plunger 21, ball valve element 36 is held closed by the pressure of liquid in the barrel, whereas ball valve element 31 is opened by the liquid pressure.

Figure 3:
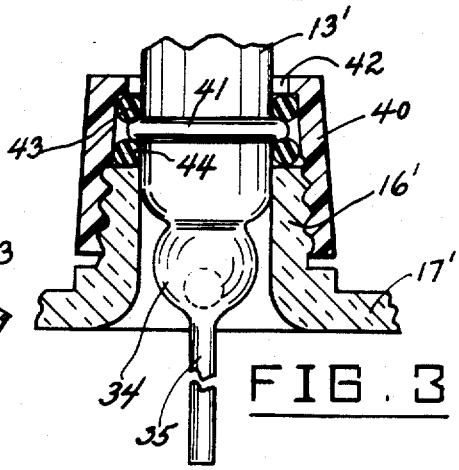
FIG. 3 is a fragmentary vertical cross-sectional view taken through the neck portion of a screw cap reagent bottle in which is mounted another form of burette apparatus according to the present invention.

In the form of the invention shown in FIG. 3, the apparatus is constructed to be mounted in the externally threaded neck 16' of a container 17', and an annular internally threaded sealing cap 40 is provided, said cap being threadedly engageable on the neck 16'. An annular outwardly projecting sealing rib 41 is integrally formed on the lower end portion of the plunger barrel, shown at 13', a short distance above the intake valve housing 34. The top wall of cap 40 is provided with a central aperture 42 just large enough to pass the rib 41. Respective resilient deformable sealing rings 43 and 44 are provided above and below the rib 41, the ring 43 preferably being split to facilitate its installation around the barrel 13' above the rib 41. An air-tight seal will be provided by the rings 43 and 44 when the cap 40 is tightened on the neck 16'. The cap 40 is loosened before the upward stroke of the plunger to allow atmospheric air to enter the top portion of container 17' to replace the liquid drawn into the barrel by said upward stroke. The cap 40 is tightened before the downward stroke of the plunger.

In the form of the invention shown in FIG. 4, the barrel, shown at 13'', is provided with a cylindrical bottom extension 45 formed to slidably enter the bore 46 of the container neck 16'. An annular outwardly projecting sealing rib 41' is integrally formed on extension 45, and respective resilient deformable sealing rings 43 and 44 are provided on extension 45 above and below the rib 41'. The cap 40 is arranged to cooperate with the rings 43, 44 and the sealing rib 41' in the same manner as in the form shown in FIG. 3. An air vent tube 19, similar to that provided in the form shown in FIG. 1, is integrally provided on the upper portion of extension 45, acting in the same manner as described in connection with the embodiment of FIGS. 1 and 2.

It will be noted that in the various forms of the invention above described, the main portion of the apparatus is essentially of one-piece integral construction and is made so that it can be automatically freed of air. The side arm 28 is secured to the barrel at the level of the fully inserted plunger without constricting the barrel. The ball stops 32 and 38 are integral with the walls of their associated housings 29 and 34 and hold their associated valve balls close to their seats, reducing back flow. The flange 20 is fully ground on its top and bottom surfaces through its complete angular extent of 360°, which assures precision dispensing even if the plunger is rotated during a dispensing action.

The annular indicating flange 25 serves as a pointer and permits fine parallax-free adjustments relative to the volumetric scale 26.

While certain specific embodiments of an improved liquid dispensing burette apparatus have been disclosed in the foregoing description, it will be understood that various modifications within the spirit of the invention may occur to those skilled in the art. Therefore it is intended that no limitations be placed on the invention except as defined by the scope of the appended claims.

What is claimed is:

[ 1. A burette device comprising a vertical cylindrical syringe chamber provided at its top end with an outwardly projecting stop flange, a dispensing plunger slidably and sealingly mounted in said chamber and having an enlarged horizontal top actuating portion, a depending vertical rod secured to said actuating portion and extending parallel to said chamber, a stop collar adjustably secured on said rod and being engageable with said stop flange to limit upward extension of said plunger, a horizontal outlet conduit formed integrally with said chamber substantially at the level of the bottom of said plunger in its lowermost position, a vertical upstanding check valve chamber integrally formed on the outer end of said outlet conduit and being provided with an outwardly and downwardly inclined discharge tip, said check valve chamber being provided with an upwardly facing ball seat, a movable valve ball on said seat, the inner wall of the check valve chamber being integrally formed with an inwardly projecting stop lug overlying said ball and limiting upward movement thereof, means on the lower end of said syringe chamber to sealingly support the syringe chamber in the mouth of a liquid container, a check valve housing formed integrally with the lower end of said syringe chamber, a depending vertical intake tube formed integrally with and communicating with the bottom of said housing and defining a ball seat at its top end, a movable valve ball on said last-named seat, and an inwardly projecting stop lug integrally formed on the inside wall of said housing, overlying said last-named valve ball and limiting upward movement thereof. ]

[ 2. The structure of claim 1, and wherein said check valve housing is substantially spherical in shape and is connected to the syringe chamber by a substantially frusto-conical upwardly flaring wall element. ]

[ 3. The structure of claim 2, and an outwardly projecting vent tube integrally formed with and communicating with the lower end of the syringe chamber subjacent said wall element and above said sealing means. ]

[ 4. The structure of claim 2, and wherein said sealing means comprises an enlarged hollow frusto-conical downwardly tapering stopper member. ]

[ 5. The structure of claim 2, and wherein said sealing means comprises an outwardly projecting annular sealing rib integrally formed on the lower portion of the syringe chamber, annular resilient deformable sealing rings surrounding the syringe chamber above and below said rib, and an annular internally threaded cap member surrounding said sealing rings and having a top wall provided with a central aperture just large enough to pass said sealing rib. ]

[ 6. The structure of claim 4, and an outwardly projecting vent tube on the top wall of said stopper member. ]

[ 7. structure of claim 1, and a scale on the vertical syringe chamber. ]

*8. A burette device comprising a vertical cylindrical syringe chamber provided at its top end with an outwardly projecting stop flange, a vertically extending volumetric scale on said vertical syringe chamber having volume indications reading from smaller amounts to larger amounts in a downward direction, a dispensing plunger slidably and sealingly mounted in said chamber and having an enlarged horizontal top actuating portion, a depending vertical rod secured to said actuating portion and extending parallel to said chamber, a stop collar adjustably secured on said rod and being engageable with said stop flange to limit upward extension of said plunger, said stop collar serving as a mechanical stop for measuring the volume to be dispensed and, when the plunger is in its lowermost position, for accurately indicating on said scale the volume to be dispensed, a horizontal outlet conduit formed integrally with said chamber substan-*

*tially at the level of the bottom of said plunger in its lowermost position, said plunger being normally in said lowermost position, a vertical upstanding check valve chamber integrally formed on the outer end of said outlet conduit and being provided with an outwardly and downwardly inclined discharge tip, said check valve chamber being provided with an upwardly facing ball valve seat, a movable valve ball on said seat, the inner wall of the check valve chamber being integrally formed with an inwardly projecting stop lug overlying said ball and limiting upward movement thereof, means on the lower end of said syringe chamber to sealingly support the syringe chamber in the mouth of a liquid container, a check valve housing formed integrally with the lower end of said syringe chamber, a depending vertical intake tube formed integrally with and communicating with the bottom of said housing and defining a ball seat at its top end, a movable valve ball on said last-named seat, and an inwardly projecting stop lug integrally formed on the inside wall of said housing overlying said last-named valve ball and limiting upward movement thereof, wherein said sealing means comprises an outwardly projecting annular sealing rib integrally formed on the lower portion of the syringe chamber, respective annular resilient deformable sealing rings surrounding the syringe chamber above and below said rib, and an annular internally threaded cap member surrounding said sealing rings and having a top wall provided with a central aperture just large enough to pass said sealing rib.*

*9. A burette device comprising a vertical cylindrical syringe chamber provided at its top end with an outwardly projecting stop flange, a vertically extending volumetric scale on said vertical syringe chamber having volume indications reading from smaller amounts to larger amounts in a downward direction, a dispensing plunger slidably and sealingly mounted in said chamber*

*and having an enlarged horizontal top actuating portion, a depending vertical rod secured to said actuating portion and extending parallel to said chamber, a stop collar adjustably secured on said rod and being engageable with said stop flange to limit upward extension of said plunger, said stop collar serving as a mechanical stop for measuring the volume to be dispensed and, when the plunger is in its lowermost position, for accurately indicating on said scale the volume to be dispensed, a horizontal outlet conduit formed integrally with said chamber substantially at the level of the bottom of said plunger in its lowermost position, said plunger being normally in said lowermost position, a vertical upstanding check valve chamber integrally formed on the outer end of said outlet conduit and being provided with an outwardly and downwardly inclined discharge tip, said check valve chamber being provided with an upwardly facing ball valve seat, a movable valve ball on said seat, the inner wall of the check valve chamber being integrally formed with an inwardly projecting stop lug overlying said ball and limiting upward movement thereof, means on the lower end of said syringe chamber to sealingly support the syringe chamber in the mouth of a liquid container, a check valve housing formed integrally with the lower end of said syringe chamber, a depending vertical intake tube formed integrally with and communicating with the bottom of said housing and defining a ball seat at its top end, a movable valve ball on said last-named seat, and an inwardly projecting stop lug integrally formed on the inside wall of said housing overlying said last-named valve ball and limiting upward movement thereof, wherein said stop collar is provided with a downwardly divergent frusto-conical annular bottom flange extending adjacent said volumetric scale.*

* * * * *